Figure 1:
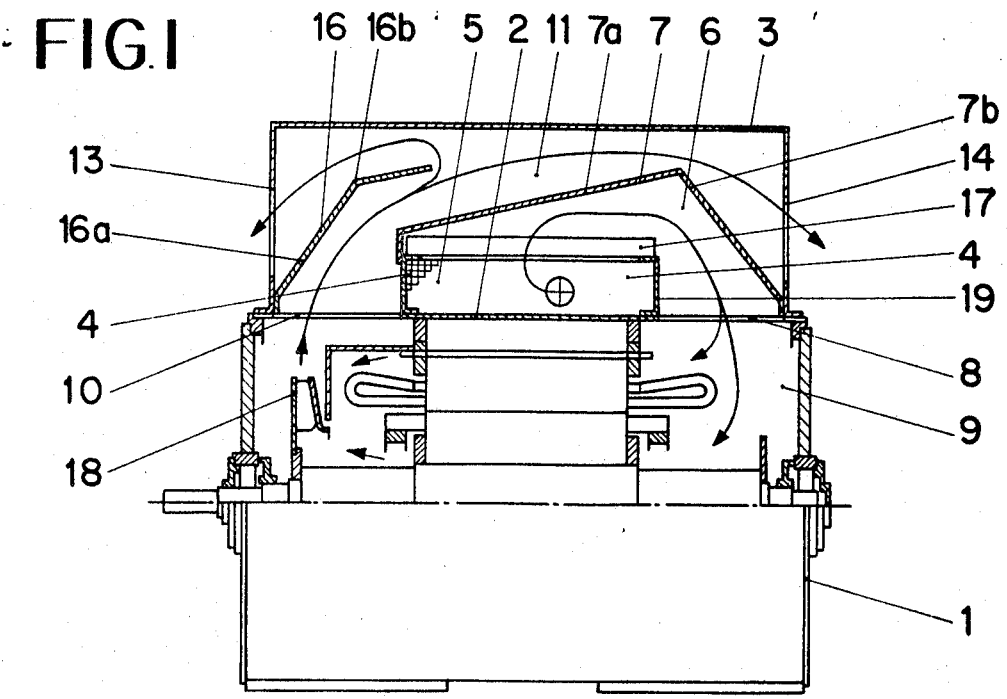

United States Patent
Keilmann et al.

[11] 3,739,207
[45] June 12, 1973

[54] WEATHER-PROTECTED ELECTRIC MACHINE WITH AXIALLY CIRCULATING VENTILATION

[75] Inventors: Philipp Keilmann, Mannheim; Helmut Gaertner, Viernheim, both of Germany

[73] Assignee: Brown Boveri & Company Limited, Baden, Switzerland

[22] Filed: Sept. 23, 1971

[21] Appl. No.: 183,008

[30] Foreign Application Priority Data
Oct. 1, 1970 Germany................ P 20 48 255.7

[52] U.S. Cl. ................................................ 310/59
[51] Int. Cl. .......................................... H02k 9/00
[58] Field of Search ................. 310/52, 53, 56, 58, 310/59, 62, 89

[56] References Cited
UNITED STATES PATENTS

| | | | |
|---|---|---|---|
| 2,777,079 | 1/1957 | Egglestone | 310/58 |
| 3,566,142 | 2/1971 | Dabell | 310/58 |
| 3,538,361 | 11/1970 | Hilterbrick | 310/58 |
| 1,883,288 | 10/1932 | Zubaty | 310/52 |
| 2,521,654 | 9/1950 | Sandler | 310/52 |
| 2,769,105 | 10/1956 | Altschwager | 310/56 |

Primary Examiner—R. Skudy
Attorney—Pierce, Scheffler & Parker

[57] ABSTRACT

An axially ventilated dynamo-electric machine for outdoor use includes a rectangular casing located stop the machine housing which is also rectangular, there being an air inlet through a longitudinal wall of the casing into an air entry chamber located within the casing. A baffle arrangement within the casing provides a passageway closed off from the remainder of the space within the casing through which filtered air discharged from the air entry chamber is directed through an opening at one end of the machine housing to the interior thereof for flow axially of the machine to cool it, and this air after passing to the opposite end of the machine housing is delivered through an outlet in the housing into the casing from whence it is discharged to the exterior through outlets provided in the end walls of the casing. A second baffle structure located in the casing at the air outlet from the machine housing and which partially overlaps the first mentioned baffle arrangement cooperates with the latter in directing the air discharge and the entire ventilating structure is so structured that air flow through the machine housing is assured regardless of the direction or strength of the wind.

2 Claims, 2 Drawing Figures

Patented June 12, 1973 3,739,207

WEATHER-PROTECTED ELECTRIC MACHINE WITH AXIALLY CIRCULATING VENTILATION

This invention relates to an improvement in a dynamo electric machine with axially circulating ventilation and a casing for weather protection which covers the entire upper housing surface of the machine, which is provided with inserts for separation into several areas, and which is equipped at least on one longitudinal side with apertures through which the cooling air enters from outside, and with a filter installed in said casing.

Weather-protected dynamo electric machines are internally cooled machines with additional protective measures for outdoor operations under special climatic conditions. Electric machines of this type are designed in such manner that the cooling air, drawn in or blown out through the cooling apertures, is subjected to deflection up to three times and up to 90° prior to arrival at the parts to be cooled in order to prevent foreign-matter, coarse dust particles, rain or snow from entering the inlets and outlets for the cooling air in case of strong winds and storms.

In the case of a known (BBC News, 1964, page 391) weather-protected three-phase motor, this protection is accomplished by providing a motor of protected design with a hood containing air ducts and a filter. The air ducts have a large cross-section, and the active parts of the motor are protected from the direct influence of rain, snow and solid particles by multiple air deflection in front of the inlet and outlet apertures, an arrangement which also reduces the entrance velocity of the air. Dust particles are kept out by the placement within the air suction path of filters which are easy to clean and which are removable. In case of this known arrangement, the cooling air is drawn in at one longitudinal side of the motor housing next to the terminal box, is guided along the rounded, upper housing part toward the installed filter, passes through the filter and then flows into the interior of the protective hood which is divided by a partition into two areas. The air is drawn by a fan, arranged within the inside space of the left bearing plate, through an aperture in the protective hood near the upper part of the left bearing plate, and guided to the parts of the motor to be cooled. After flowing through the active parts of the motor, the warmed-up cooling air arrives at the right bearing plate and emerges from the motor upward through an aperture leading into the second area of the hood. The air, after being deflected again, will then flow through an aperture of the weather-protecting hood into the open air. This known arrangement has the disadvantage that under unfavorable wind conditions the outflowing heated cooling air will, at least partially, be drawn back again, thus disturbing greatly the cooling operation.

Another weather-protected motor is also known whereby the cooling air flows along the two longitudinal sides of the machine into an air deflecting chamber, installed on top of the motor, is distributed therein, flows along the two bearing plates into the interior of the motor and, after completion of the cooling of the active parts, is guided from the lower center of the motor through the motor base into the open air (Conti-Elektro-Berichte 1950), pages 70 and 81). However, this specific arrangement for weather protection is only applicable in case of motors where the cooling air flows along the two front ends into the two bearing plates, leaving at the motor center, but not in case of machines with circulating ventilation in axial direction, where the cooling air enters at one bearing plate and exits at the other plate.

Also known is an electromotor with a weather-protecting casing which is provided with air deflecting ducts, formed by partitions, this casing covering against the outside, the air inlet and outlet apertures, located on top of the bearing plates of a machine with axially circulating ventilation, whereby the air enters from the outside at the longitudinal side of the machine an intake opening, arranged directly above the stator housing, and whereby the cooling air, heated up after cooling the motor, emerges from an aperture which is arranged at the front side of the weather-protecting casing (German Gbm 1 974 706). This arrangement of record has the serious disadvantage however that winds, blowing in the direction of the aperture, could, if possessing the appropriate strength, counteract completely the effects of the motor ventilation, with the result that the flow of air will be halted.

It is a primary object of the present invention to create a weather-protected dynamo-electric machine with axially circulating ventilation while avoiding the disadvantages of the above discussed known arrangements, and specifically to definitely avoid the possibilities that under unfavorable wind conditions, the outflowing heated cooling air is drawn back into the apertures for fresh air, or the cooling operation is rendered ineffective by winds of corresponding strength.

The present invention solves this problem for the above mentioned dynamo-electric machine in that the air filter is arranged parallel to the base of the motor housing and above the air entry chamber which extends across the active part of the machine and which is blocked off from the interior motor space by separating walls; that above the air filter there is arranged a system of baffles, extending in the longitudinal direction of the motor, their surfaces partially ascending and partially descending, and closing off the area above the filter against the area enveloped by the casing; that the motor housing is provided at one end on its surface with an intake aperture, connecting the area with the interior of the motor; that the motor housing is further provided on its surface and at the side opposite to the intake aperture with an air outlet aperture, connecting the upper area of the casing with the interior area of the motor; and finally that air outlet apertures are provided at the two ends of the casing. In case of this machine, designed in accordance with the invention, the major portion of the heated cooling air will emerge at one of the two ends of the machine, depending on the wind conditions. Thus, it becomes impossible for the cooling operation to fail because of a strong wind pressure from one side. Quite to the contrary, such conditions will be helpful by generating an additional suction effect.

It will also be helpful and advantageous for the purpose of the invention to provide an upwardly inclined baffle above the outlet aperture.

In a further development of the invention the baffle is provided with a sharp bend, running vertically to the machine axis, with the incline of its plane being relatively steep in the beginning, and more gentle after the bend.

It is also possible within the scope of the invention to cover the air inlet and/or outlet apertures with screens.

Figure 2:
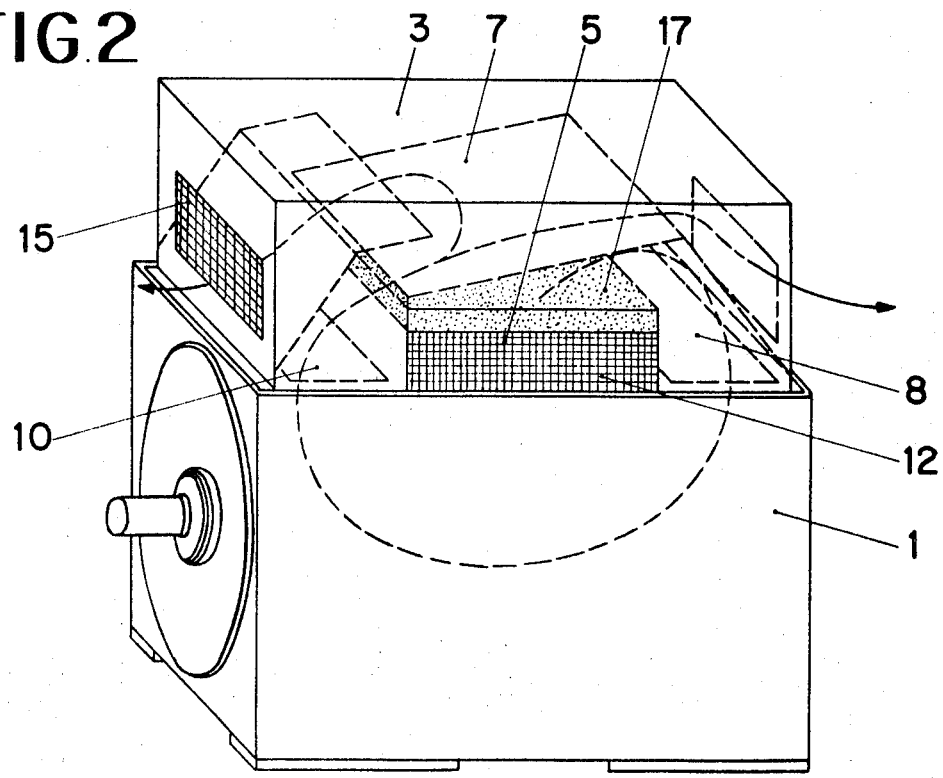

Further details and advantageous improvements of the invention are disclosed by the species, described below as well as illustrated by the accompanying drawings wherein:

FIG. 1 shows a longitudinal cross-section of a dynamoelectrical machine in accordance with the invention; and FIG. 2 provides a diagrammatic view in perspective of the dynamo-electric machine, with the path of the cooling air drawn in.

With reference to the drawings, the housing of the dynamo-electric machine is denoted by numeral 1, with the casing 3 mounted at the upper housing surface 2, the bases of the electrical machine and of the casing being identical in size. Above the active part of the electric machine there is provided a rectangularly shaped chamber 5 which extends across the entire width of the machine, its sides being delimited by partitions 4, and which is provided at the two sides of the casing with apertures, the apertures being covered by screens 12. An air filter 17 is arranged above the rectangular chamber 5. Above the air filter 17 there is arranged a baffle 7 which extends across the entire width of the machine. The baffle extends from the left (drive-facing) side of the chamber 5 at a low angle of rise 7a in the direction of the other bearing plate, and bends sharply, approximately above the right bearing plate, in such manner that it joins the lower end of the weather-protecting casing at a steeper downward angle 7b, thus forming a connecting area 6 which is closed off from the upper region of the casing but is in communication with the interior area 9 of the electrical machine by way of an inlet aperture 8. At the second (drive-facing) bearing plate there is provided within the upper part of the housing an air outlet (exit) aperture 10 which is in communication with the outlet area 11 of the casing 3. At the ends of the casing 3 there are provided the air outlet apertures 13 and 14, covered by screens 15. Also provided within the area 11 of the casing is another baffle 16, extending over the entire width of the motor. This baffle is fastened at the lower point of the drive-facing end of the casing, and extends at the beginning at a steep angle of rise 16a for the greater portion of its entire length, bends sharply at point 16b, and continues from there at a lesser angle of rise.

During the operation of the electrical machine, the cooling air arrives at the rectangular chamber 5 through the apertures arranged at the two longitudinal sides of the casing, is deflected there by approximately 90° and flows through the filter 17 into the connecting area 6. After another deflection, the air hits the steep-angled surface 7b of the partition, is deflected again and then reaches the air intake aperture 8 of the machine. After being deflected again, the cooling air comes into contact with the parts of the electric machine to be cooled, flows through the machine and the exhauster 18, is forced through the air outlet aperture 10 into the air outlet space 11 of the casing 3, and finally flows out at air outlet apertures 13 or 14 respectively. The air will flow from apertures 13 and 14 at greater or lesser quantities, subject to the direction and strength of the wind. For example, if the wind pressure at the aperture 14 of the casing is relatively strong, the greater portion of the heated cooling air will flow from aperture 13. In the opposite case, that is, if the wind pressure is relatively strong at the aperture 13, the greater portion of the heated cooling air will flow from the aperture 14. The wind by passing through the outlet space 11, will serve due to its suction effect as a booster for the pressure effect of the exhauster.

We claim:

1. An axially ventilated dynamo-electric machine which comprises a housing enclosing the machine, said housing having an essentially rectangular configuration, an air-handling casing also having an essentially rectangular configuration of substantially the same dimensions as the top wall of said machine housing and mounted thereon, means forming an air entry chamber within the lower part of said casing spaced from the opposite end walls thereof, at least one lateral air inlet into said air entry chamber from the exterior formed by an aperture in a side wall of said casing extending longitudinally of the machine axis, an air filter disposed across the upper discharge end of said air entry chamber, an air inlet through said top wall of said machine housing adjacent one end thereof to the interior of the machine, a first baffle means located within said casing, said first baffle means closing off the remainder of the space within said casing from said air entry chamber and said air inlet through said top wall of said machine housing and providing a passageway for conducting air from said air entry chamber into said machine at one end thereof, said first baffle means including one ascending wall leading from the discharge side of said filter and one descending wall leading to said air inlet through said top wall of said machine housing, an air outlet through said top wall of said machine housing at the opposite end thereof through which air is discharged into said casing and exteriorly of the space confined by said first baffle means after passing axially through the interior of said machine, a second baffle means located within said casing at said air outlet through said top wall of said machine housing, said second baffle means including an initially steeply inclined first wall section followed by a second wall section of lesser inclination for directing the flow of air from said air outlet through said casing, said second baffle means partially overlying and being spaced from said first baffle means, and air outlets located in the opposite end walls of said casing said second baffle means directing the flow of air warmed by passage through the machine housing to the exterior to said air outlets.

2. An axially ventilated dynamo-electric machine as defined in claim 1 and which further includes screens respectively covering said air inlet to said air entry chamber and said air outlets in the opposite end walls of said casing.

* * * * *